J. B. HEARD.
SYSTEM OF ELECTRIC CIRCUIT CONTROL.
APPLICATION FILED AUG. 16, 1918.

1,406,731. Patented Feb. 14, 1922.
2 SHEETS—SHEET 1.

Witnesses
James F. Crown
A. P. Hollingsworth

Inventor
James B. Heard,
By Richard B. Owen,
Attorney

J. B. HEARD.
SYSTEM OF ELECTRIC CIRCUIT CONTROL.
APPLICATION FILED AUG. 16, 1918.
1,406,731.
Patented Feb. 14, 1922.
2 SHEETS—SHEET 2.
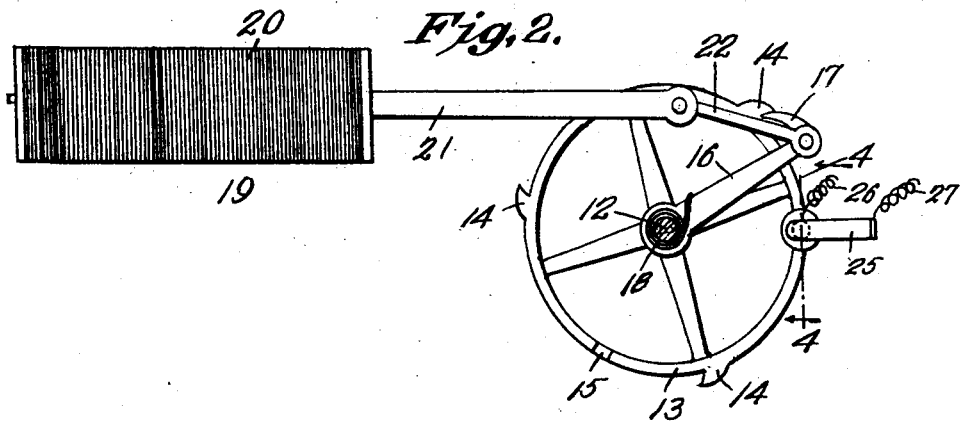
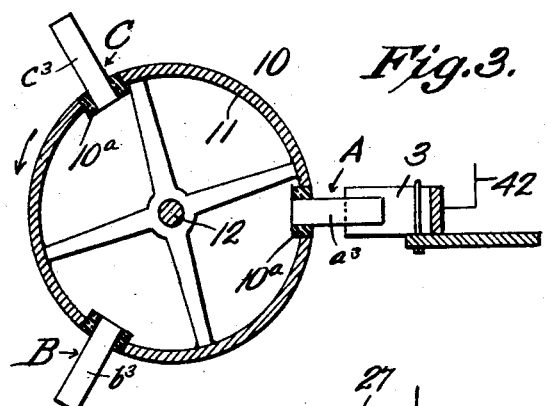
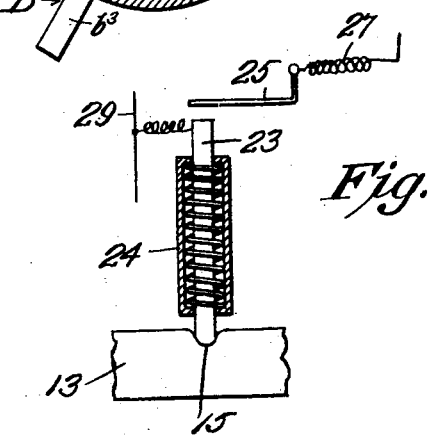
Witnesses
James F. Brown
J. P. Hollingsworth
Inventor
James B. Heard,
By Richard B. Owen,
Attorney

UNITED STATES PATENT OFFICE.

JAMES B. HEARD, OF SAN ANTONIO, TEXAS.

SYSTEM OF ELECTRIC-CIRCUIT CONTROL.

1,406,731.  Specification of Letters Patent.  Patented Feb. 14, 1922.

Application filed August 16, 1918. Serial No. 250,230.

*To all whom it may concern:*

Be it known that I, JAMES B. HEARD, a citizen of the United States, residing at San Antonio, in the county of Bexar and State of Texas, have invented certain new and useful Improvements in Systems of Electric-Circuit Control, of which the following is a specification.

This invention relates to systems of electrical circuit control, designed primarily for small power plants, and has for its primary object to provide, in a system of this class, a control switch for starting the current generating mechanism whenever a switch on the main line leading from the generator is closed, and for stopping said mechanism when the line is open or broken, the whole operation being performed automatically by making and breaking the circuit in the main line.

Another object of the invention is to provide an electrical power plant system with a controller switch and electrical operating means therefor actuated by a battery, which switch, when the main line circuit from the generator is open, automatically connects said battery to the main line and holds the same thus connected until the circuit in the line is closed, whereupon a shunt circuit from the battery is sent through the control motor which being moved, will make and break certain contacts, with the result that the battery is cut out of the main line circuit, the motor for driving the generator started, the generator connected with the main line, and finally the battery circuit through the control motor broken to stop the movement of the switch in such position that the generator will be coupled to the main line. In this position the controller switch will remain as long as the current is being used in the line, but upon opening the line circuit by cutting out the current absorbing device connected therewith, the controller motor circuit is automatically closed and the switch moves into its first position, ready for operation when the main line circuit is closed.

A further object of the invention is to provide in a system of electrical circuit control, an intermittently operated rotary controller switch that is self operated under all conditions and is of particular advantage in small power plants where it is difficult or inexpedient to have an attendant to start and stop the current generating mechanism. The controller switch, its operating device and connections, comprises few parts and are of simple construction and when once regulated, will require practically no attention other than the recharging of the battery. Furthermore, the connections to the controller switch are such that if the circuit in the main line from the generator be open, closing said circuit by cutting in a single electric light, a motor, or other current absorbing device will start the switch to rotating and by its rotation, operate the starter of an internal combustion engine to drive the generator, connect the main line to said generator, the battery to the switch motor and finally cutting out the mechanism operating the switch and causing said switch to remain in fixed position until the main line is again opened, whereupon the switch is automatically started and completes its cycle, returning to its first position where it will be ready to once more perform its function when the circuit through the main line is again closed.

With these objects in view, together with others which will appear as the description proceeds, the invention resides in the novel formation, combination and arrangement of parts, all as will be described more fully hereinafter, particularly pointed out in the claims, and illustrated in the accompanying drawings, in which:—

Figure 2 is an elevation of the controller switch motor and the operating connections therebetween and the controller switch.

Figure 3 is a cross sectional view of the controller switch, and

Figure 4 is a sectional view of a secondary switch for maintaining a battery circuit in the switch motor during intermittent operations of the switch.

Figure 1:
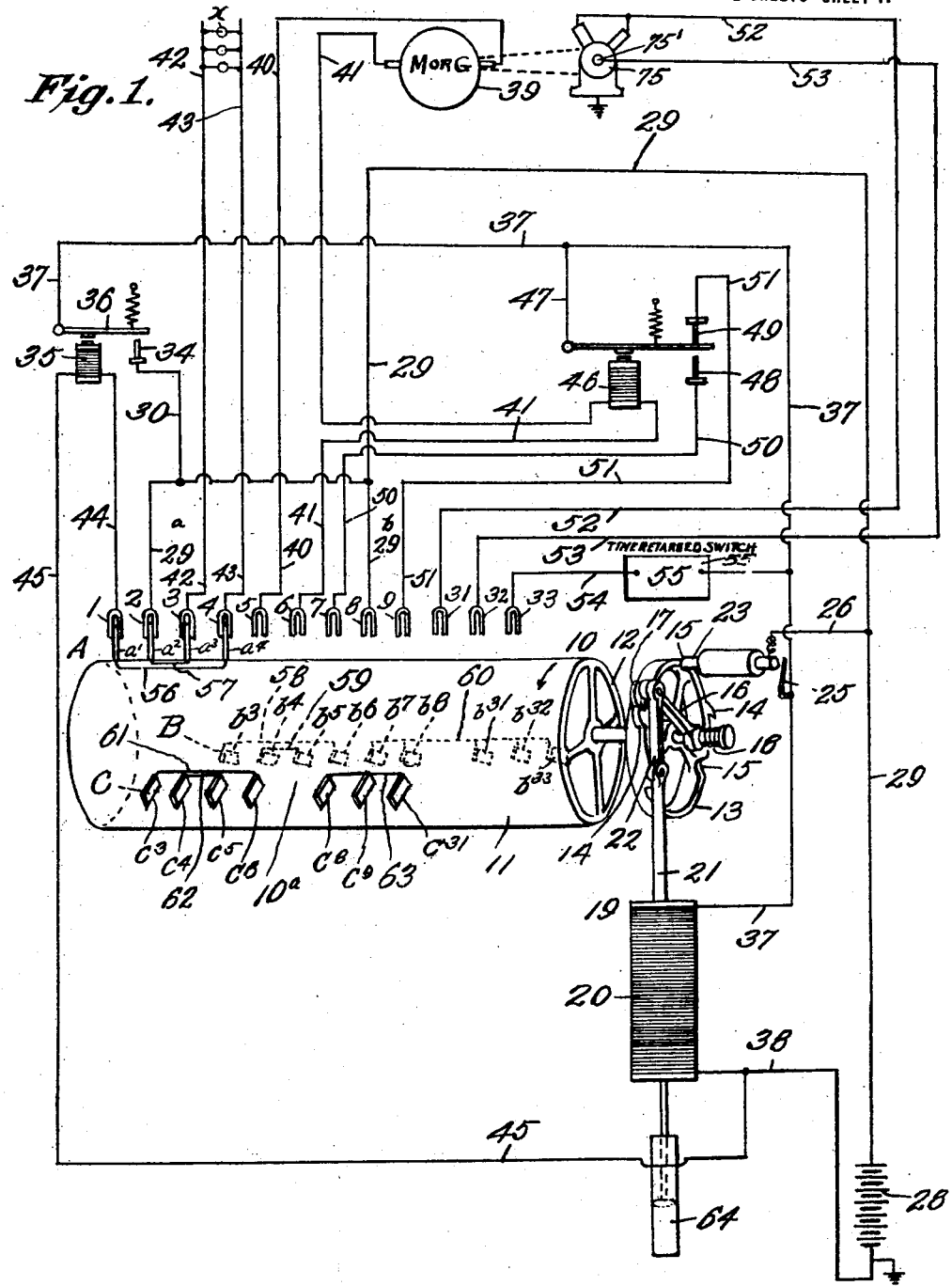
Figure 1 is a diagrammatic view of the entire system including the controller switch and its operating motor.

In the drawings, 10 indicates the rotary controller switch comprising in the present instance a drum 11 of cylindrical form fixed to a rotatable shaft 12 supported in bearings, not shown, said shaft also carrying near one end beyond the drum 11 a ratchet wheel 13. The ratchet wheel 13 is provided with three teeth 14 projecting from its peripheral surface and with three depressions 15 in the exterior side of the same, the teeth 14 being equally spaced around the periphery of the wheel and the depressions 15 also equally spaced.

Mounted to rock freely on the shaft 12 is a radius arm 16, on the outer end of which is pivoted a pawl 17 adapted to engage with the teeth 14 when the arm 16 is vibrated. A spring 18 is carried about the shaft 12, one end being fixed to said shaft, the opposite end of the spring bearing upon the arm 16 and tending to move the arm in one direction. Movement in the other direction is accomplished by an electrical motor 19 here shown as a solenoid 20 having a longitudinally movable core 21 of magnetic material pivotally connected at one end by a link 22 with the outer end of the arm 16. Upon passing an electrical current through the solenoid 20, the core 21 is drawn into the solenoid, vibrating the lever 16 and causing a partial rotation of the ratchet wheel 13 and drum 11 through the engagement of the pawl 17 with one of the teeth 14. Upon breaking the current through the solenoid the spring 18 reacts and returns the arm to the position shown in Figure 2 ready for another intermittent movement of the ratchet wheel. For holding the ratchet wheel 13 against accidental movement when the arm 16 is returned or when the parts are at rest, a pin 23 is mounted at the side of the ratchet wheel in such position that one end will engage a notch 15 in the side of said wheel, this pin being forced against the wheel by means of a spring 24. The edges of the notches 15 are sufficiently rounded or inclined to permit the pin to be pushed out of engagement with the notch and moved endwise upon the exertion of the slight power required to rotate the ratchet wheel. Another function of the pin 23 is to close an electrical circuit through a switch 25, this switch comprising a spring arm placed with its free end in position to be engaged by the pin 23 striking it when forced outwardly from the notch 15. Wires 26 and 27 connect said pin and spring respectively to a battery circuit leading through the solenoid 20, as hereinafter described.

Projecting radially from the drum 11 of the controller switch 10 are three series of contact fingers indicated respectively at A, B and C. The fingers of each series are arranged in groups in a straight longitudinal line on the drum 11, the fingers of each group being spaced equal distances apart. The drum 11 may be made of non-conducting material if desired, or of metal in which latter case the fingers will be insulated from the drum by connecting to the drum a section of non-conducting material as shown at $10^a$.

At one side of the drum are mounted upon a fixed insulated support, a series of electrical contacts indicated by the numerals 1, 2, 3, 4, 5, 6, 7, 8, 9, 31, 32 and 33. These fingers which are shown as forked are equally spaced from one another, the distance therebetween being the same as that between the fingers of each group on the drum 11. As the drum rotates in the direction of the arrow, the fingers of the series A, B and C successively engage such fixed contacts of the series from 1 to 9 and from 31 to 33 as are in line with said fingers, closing certain electrical circuits which will be more fully set forth hereinafter.

Forming a part of the present system is a battery 28 from which a wire 29 extends to a point near the fixed contacts, where it divides, one branch $29^a$ being connected to the fixed contact 2 while the other branch $29^b$ is connected to the fixed contact 8. From the branch $29^a$ a wire 30 extends and is connected to a contact 34 of a relay 35. The armature lever 36, held away from the contact 34 when no current is passing through the relay, is connected by a wire 37 to one end of the solenoid 20, the opposite end being connected by a wire 38 to the battery 28. The circuit thus traced will, when the relay 35 is energized, be completed by said relay and energizing the solenoid 20, the latter will operate to turn the ratchet wheel 13 and the drum 11 a third of a revolutiton.

The motor or generator of the system is indicated at 39, leads 40 and 41 from the generator pass respectively to the fixed contacts 5 and 6, while from the fixed contacts 3 and 4, the line wires 42 and 43 respectively extend. The relay 35 is connected on one side by wire 44 to fixed contact 1 and on its opposite side by wire 45 to the battery 28 through its connection to wire 38 from the solenoid. Lead wire 41 from the generator 39 contains a relay 46, the armature lever of which is connected by a wire 47 to wire 37 leading from relay 35 to the solenoid 20. The relay 46 has a front contact stop 48 and a back contact stop 49, the former being connected by a wire 50 to fixed contact 7, the back stop contact 49 in turn being connected by wire 51 with the fixed contact 9. Of the remaining fixed contacts, the one numbered 31 is connected by wire 52 with the ignition system of the internal combustion engine 75 by which the generator 39 is driven. The contact 32 is connected by a wire 53 with the starting motor 75' of said engine and contact 33 is connected by wire 54 to the wire 37 leading from relay 35 to the solenoid. The wire 54 passes through a time switch 55 of any approved type.

In what may be called the normal or inoperative position of the system and the controller switch 10, represented in Figure 1, the fingers of the series A and indicated at $a^1$, $a^2$, $a^3$, and $a^4$ are in electrical contact respectively with the fixed contacts 1 2, 3, and 4. These fingers which comprise all that are in the A group of fingers are connected in pairs the fingers $a^1$ and $a^4$ being joined by a conductor 56 and $a^2$ and $a^3$ by a conductor 57.

The series of fingers represented by B are indicated individually at $b^3$, $b^4$, $b^5$, $b^6$, $b^7$, $b^8$, $b^{31}$, $b^{32}$, and $b^{33}$. These fingers are arranged in two groups, one group includes fingers $b^3$, $b^4$, $b^5$, $b^6$, $b^7$, $b^8$, which will, when the drum 10 is given one third of a revolution in the direction indicated by the arrow, be brought into electrical engagement with the fixed contacts 3, 4, 5, 6, 7, and 8. The other group including fingers $b^{31}$, $b^{32}$, and $b^{33}$ will at the same time connect with fixed contacts 31, 32, and 33. Further movement of the drum in the direction indicated will bring series of fingers C into contact with the fixed fingers. One group of the fingers of series C indicated by $c^3$, $c^4$, $c^5$ and $c^6$ will close the circuit with fixed contacts 3, 4, 5, and 6, while the other group $c^8$, $c^9$, and $c^{31}$ engage contact fingers 8, 9 and 31. Of the B series, fingers $b^3$ and $b^6$ are joined by a connector 58, while $b^4$ and $b^5$ are joined by a connector 59. Of the remaining fingers of this series, $b^7$, $b^8$, $b^{31}$, $b^{32}$, and $b^{33}$ are all electrically connected as by a wire 60.

In the C group of fingers, $c^3$, and $c^6$ are electrically connected as at 61 and $c^4$ and $c^5$ joined by a wire 62. Fingers $c^8$, $c^9$ and $c^{31}$ are connected together, a conductor 63 joining these fingers.

A system such as described coupled to a dynamo driven by an internal combustion engine equipped with an electric sharter constitutes a complete plant for intermittent service such as farm lighting and other uses about the farm and is also suitable for small factories and may be mounted upon automobiles, the main line wires being connected to the driving electric motor or motors. The operation of the system being wholly automatic, the necessity of employing a person to start and stop the plant each time it is to be used or discontinued is thus avoided.

The operation of the system is as follows. With the parts in the position shown in Figure 1, which may be called the normal or inactive position, the fingers $a^1$, $a^2$, $a^3$ and $a^4$, which constitute the A series of fingers on the drum 11, are in electrical engagement with the fixed contacts 1, 2, 3 and 4. The dynamo and its engine will not be running and the leads 40 and 41 from the dynamo are disconnected from the main line wires 42 and 43 at the fixed contacts 5 and 6. Under such conditions the battery circuit which extends from battery 28 by wires 29, branch wire 29$^a$, contact 2, finger $a^2$, connector 57, finger $a^3$, contact 3, and main line wire 42, is open because none of the current consuming devices $x$ such as lamps, motors and the like are in use and their switches are open. The return line wire 43 is connected to fixed contact 4 and the circuit proceeds thence by finger $a^4$, connector 56, finger $a^1$, contact 1, wire 44, magnet of relay 35, wire 45, and wire 38 to the battery. The circuit therefore is open only at $x$. If now the switch of any of the devices $x$ in the main line be closed, the circuit of battery 28 will be completed and the magnet of relay 35 energized, attracting its armature. The armature lever 36 coming in contact with the stop 34, closes a shunt circuit from the battery branch wire 29$^a$, wire 30, stop 34, armature lever 36, wire 37, solenoid 20 of the switch motor 19 and thence by wire 38 to battery. This shunt circuit energizes the solenoid 20 and causes it to draw its armature 21 inwardly and rock the lever 16 connected thereto. The pawl 17 carried by said lever engages one of the teeth 14 of the ratchet wheel 13 and turns said wheel and the drum 11 one third of a complete revolution in the direction indicated by the arrow, a movement that causes the A series of fingers on the drum to become disengaged from the fixed contacts and the B series of fingers to connect therewith. The moment fingers $a^1$ and $a^4$ separate from contacts 1 and 4, the battery circuit through the magnet of relay 35 is broken and the magnet de-energized, its armature lever being drawn out of contact with stop 34 by a spring in the usual manner. This opens the battery circuit through the solenoid before the complete movement of the drum has taken place, but to compensate for this, one end of the pin 23, which is always in a notch 15 in the ratchet wheel 13 when the drum is stationary, is forced out of said notch by the turning of the ratchet wheel and the pin caused to move in an endwise direction, its opposite end coming into contact with the switch 25 and so closing the battery circuit through solenoid 20 by wire 26 connected to battery wire 29, pin 23, switch 25 and wire 37. This circuit remains unbroken until the completion of the intermittent movement of the drum because the pin 23 riding against the edge of the ratchet wheel, is held by said edge in contact with switch 25 until the next succeeding notch 15 is brought into line with the pin which enters the notch and so opens the circuit through the solenoid at switch 25 at the end of the intermittent movement.

In the second position of the drum 11, the circuit through the solenoid 20 being broken at switch 25, as stated, the spring 18 reacts on the lever 16 to return the latter and the armature 21 to their original positions and the pawl 17 into engagement with another of the teeth 14. With the drum in its new position, the fingers $b^3$, $b^4$, $b^5$, $b^6$, $b^7$, $b^8$, $b^{31}$, $b^{32}$, $b^{33}$, of the series B make electrical connection with the fixed contacts 3, 4, 5, 6, 7, 8, 31, 32, 33. The leads 41 and 40, connected to the fixed contacts 6 and 5, are coupled to the main line wires 42 and 43 through the fingers $b^6$ and $b^5$, connectors 58, and 59, fingers $b^3$ and $b^4$ and fixed contacts 3 and 4, to which the line wires 42 and 43 are connected, so that when current is generated by the rotation of the dynamo, it will pass directly to the line wires. At the same time the dynamo and line wires are connected by fingers of the B series, the battery circuit passes by way of branch wire 29$^b$, fixed contact 8, and finger $b^8$ to connector 60 which joins the fingers $b^7$, $b^{31}$, $b^{32}$ and $b^{33}$. No current can pass by way of finger $b^7$ and the fixed contact 7 because the latter is connected to the open stop 48 of relay 46, but current may pass through fingers $b^{31}$ and $b^{32}$ to contacts 31 and 32 and by wires 52 and 53 from said contacts to the ignition system of the engine and to an electrical starter, indicated by 75', by means of which the internal combustion engine driving the dynamo is set in motion. A ground return from the ignition system and starter is effected by grounding the engine and battery as shown in the drawings. Immediately the battery circuit through the finger $b^{32}$ and contact 32 is completed, the electrical starter starts the engine and the dynamo, driven thereby, generates a current which passes to the line wire, through the connections described. Upon starting the dynamo 39 rotating, the current therefrom passes through the magnet of relay 46, attracting the armature thereof and drawing the lever of the armature into contact with the front stop 48 of the relay. This will cause a portion of the battery current to pass from the connector 60 through finger $b^7$, fixed contact 7, wire 50, contact 48, armature lever of relay and wire 47 to wire 37 which leads to the solenoid 20. This will cause the solenoid to turn the drum as before through one third of a revolution which will bring the fingers of the C series into electrical engagement with the corresponding fixed contacts. Should, however, the engine fail to start and the dynamo continue at rest, no current of course will be generated. The relay 46 will remain inactive and the battery circuit through stop 48 and armature lever continue broken, the solenoid will not operate. To provide for this contingency, the finger $b^{33}$ will engage the fixed contact 33 and by way of the wire 54 connected thereto and to the time switch 55 which latter is connected to the wire 37, the solenoid will be energized.

In the new position of the drum 11, the fingers $c^3$, $c^4$, $c^5$ and $c^6$ of the C series are in electrical connection with the fixed contacts 3, 4, 5, and 6, thus continuing the line wires 42 and 43 in connection with the leads 40 and 41 of the dynamo. The other fingers $c^8$, $c^9$, and $c^{31}$, of the C series engage the fixed contacts 8, 9 and 31 thereby shifting the battery circuit entering through branch 29$^b$, contact 8 and finger $c^8$ to fingers $c^9$ and $c^{31}$ which are joined by a connector 63. As in the second position of the drum, battery circuit passed to the ignition system of the engine through finger $b^{31}$, fixed contact 31 and wire 52, so in the present position of the drum the same battery circuit passes through finger $c^{31}$, contact 31 and wire 52 to the ignition system. Finger $c^9$ engaging the fixed contact 9 is in an open circuit because the wire 51 leading from the fixed contact 9 passes to the back stop 49 of relay 46 which stop is open so long as the dynamo is running and a current passes through the magnet of the relay. The drum in its present situation connects the dynamo to the line wires and the battery to the ignition system, there being no other connections with the fixed contact other than the finger $c^9$ which as stated is in an open circuit. The switch will remain in this position as long as the circuit in the main line is closed and, even a single light will be sufficient to maintain its position. When, however, the last light is put out, or the last motor stops or in any other manner the circuit between main line wires 42 and 43 is broken, the magnet of relay 46 is de-energized and the armature lever of said relay drawn away from the magnet by a spring until it contacts with the back stop 49. The battery circuit will once more be closed through the solenoid 20 by wire 29, branch 29$^b$, contact 8, finger $c^8$, connector 63, finger $c^9$, contact 9, wire 51, back stop 49, armature lever of relay 46, wire 47, and wires 37 to solenoid.

The solenoid thus energized turns the drum once more for a third of a revolution which will bring the fingers of the A series into the position shown in Figure 1 or normal position ready for another cycle whenever the circuit in the main line is closed.

To prevent the drum from moving too far through its momentum after each operation by the motor 19, a dash pot 64 is connected to the rear end of the armature 21, this dash pot serving to retard the motion of the armature just before it reaches the end of its movement. By this means the drum will always stop with the fingers of one or the other series in proper engagement with the fixed contacts.

Having thus fully described my invention, what I claim as new and desire to secure by Letters Patent, is:

1. In a system of electric circuit control including a dynamo and a line circuit, a controller switch between said line and dynamo, an auxiliary generator and a motor driven by the auxiliary generator for operating said switch to disconnect the line from the dynamo when the line circuit is open, to stop the dynamo, and to cut the auxiliary generator into the line circuit, and when said line circuit is closed to automatically start the switch motor, cut out the auxiliary generator from the line and then connect the line and dynamo circuits and start the dynamo.

2. In a system of electric circuit control including a dynamo and a line circuit, a controller switch between said line and dynamo, an engine for driving said dynamo, an electric starter for said engine, an auxiliary generator and a motor driven by the auxiliary generator for operating said switch to disconnect the line from the generator when the line circuit is open, to stop the dynamo, and to cut the auxiliary generator into the line circuit, and when said line circuit is closed to automatically start the switch motor and operate the switch to cut out the auxiliary generator from the line, connect the line and dynamo circuits, and start the dynamo by temporarily closing the circuit of the auxiliary generator through the electric starter.

3. In a system of electric circuit control including a dynamo and a line circuit, a controller switch between said line and dynamo, means for intermittently rotating said switch, an auxiliary generator for operating said means and turning the switch to disconnect the line circuit from the dynamo and stop the dynamo when the line circuit is open, and shunt circuits from said auxiliary generator controlled by said switch to cut said generator into the line circuit when said circuit is open, and when the line circuit is closed to automatically operate the switch driving means, cut out the auxiliary generator from the line, connect the line and dynamo circuits, and start the dynamo.

4. In a system of electric circuit control, a controller switch, means mounted thereon for intermittently rotating the same, an electric motor for operating said means, a line circuit, a dynamo adapted to be connected to and disconnected from the line circuit by the rotation of said switch, an auxiliary generator, circuits from said auxiliary generator to the switch operating motor controlled by the movement of the switch, and shunt circuits from said auxiliary generator also controlled by the switch and means operable by the control switch for breaking the main line circuit and stopping the dynamo and causing the auxiliary generator to be cut into the main line, and means for moving the switch to cut the dynamo into and the generator out of the main line, when the line circuit is again closed.

5. In a system of electric circuit control, a controller switch, means for intermittently rotating said switch, an electric motor for operating said means, a main line circuit, a dynamo adapted to be connected to and disconnected from the main line by the rotation of the switch, an auxiliary generator, a circuit from said generator to the switch motor controlled by the rotation of the switch, a relay in said latter circuit, shunt circuits from said auxiliary generator circuit controlled by said switch, one of said shunt circuits being opened and closed by said relay, a second relay in the dynamo circuit controlling other of the shunt circuits, said shunt circuits serving to close or maintain the auxiliary generator circuit to the switch operating motor.

In testimony whereof I affix my signature in presence of two witnesses.

JAMES B. HEARD.

Witnesses:
 STACEY W. WILLEY,
 WILLIAM F. LOWNDES.